United States Patent
Williams et al.

[11] 3,761,142
[45] Sept. 25, 1973

[54] ELECTRO-MAGNETICALLY CONTROLLED FLUID-PRESSURE SYSTEMS

[75] Inventors: Eric Farmer Williams; Thomas David Turner; Peter Raymond Johnson, all of London, England

[73] Assignee: Westinghouse Brake and Signal Company, Limited, London, England

[22] Filed: Dec. 2, 1971

[21] Appl. No.: 204,076

[30] Foreign Application Priority Data
Jan. 14, 1971  Great Britain..................... 1,865/71

[52] U.S. Cl..................... 303/22 R, 303/29, 303/40
[51] Int. Cl............................................. B60t 8/18
[58] Field of Search.................... 303/1, 3, 22 R, 29, 303/40, 52, 53, 33

[56] References Cited
UNITED STATES PATENTS

| | | | |
|---|---|---|---|
| 2,874,002 | 2/1959 | Cambeis | 303/40 X |
| 2,950,147 | 8/1960 | Neubeck | 303/22 R |
| 2,955,882 | 10/1960 | Juhlin | 303/29 |
| 3,118,707 | 1/1964 | Simmons et al. | 303/22 R |

Primary Examiner—Duane A. Reger
Attorney—Robert B. Larson et al.

[57] ABSTRACT

An electro-magnetically controlled fluid-pressure braking system the normal manner of operation of which is by selective energisation of electro-magnetic valves selectively to apply fluid-pressure to a multi-diaphragm stack; the system being alternatively operable in the event of loss of electro-magnetic control by applying fluid-pressure directly to the diaphragm stack through what is normally the exhaust parts of the stack.

11 Claims, 1 Drawing Figure

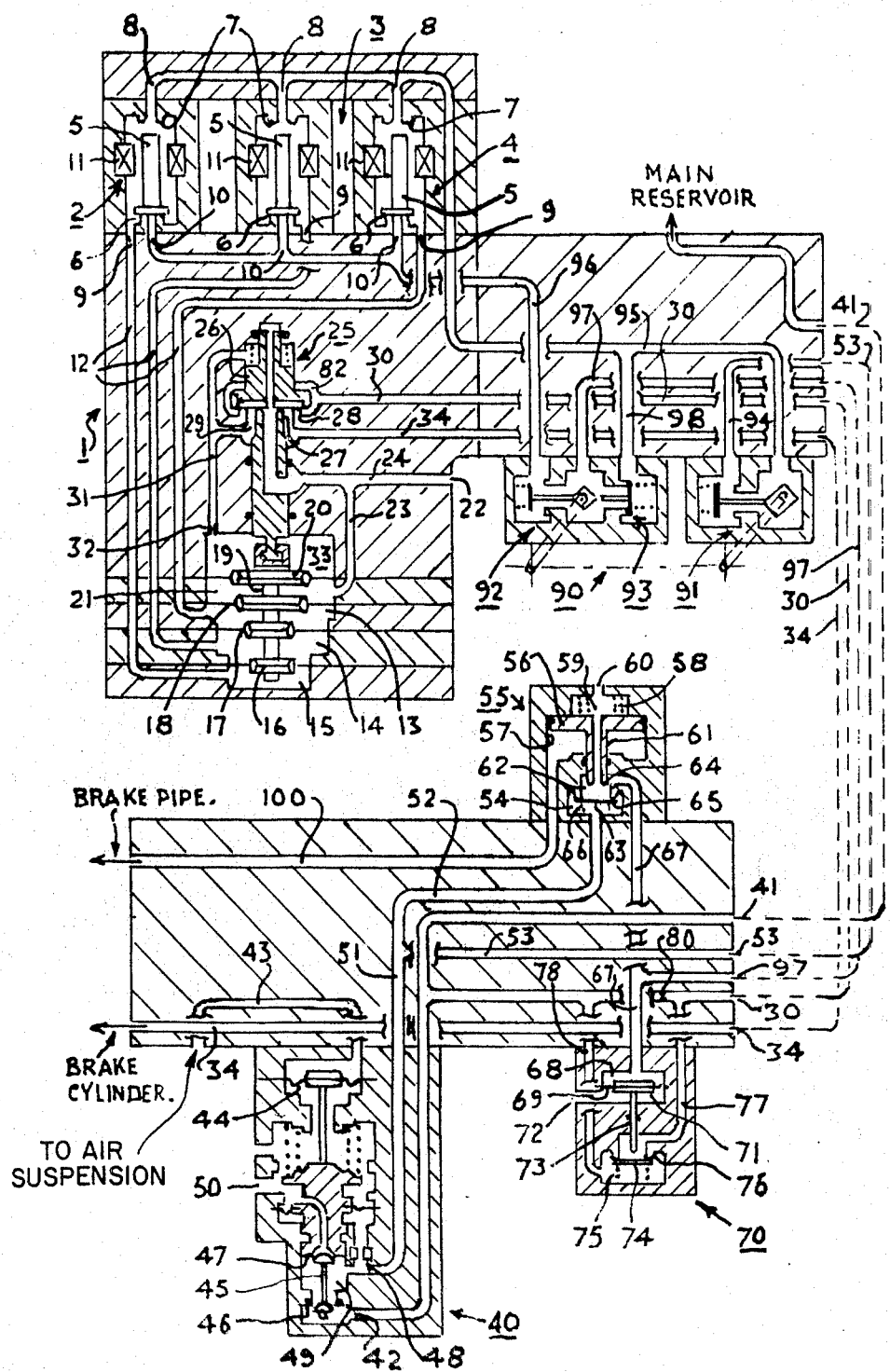

ELECTRO-MAGNETICALLY CONTROLLED FLUID-PRESSURE SYSTEMS

The present invention relates to electro-magnetically controlled fluid-pressure braking systems and more particularly to such systems having a plurality of electro-magnetically controlled first valves each controlling communication between a first fluid-pressure inlet port, a first outlet port, and a first exhaust port associated with each of the first valves; multiple pressure-responsive members of differing effective areas operatively controlling a second valve itself controlling communication between a second fluid-pressure inlet port, a second outlet port connected to a brake cylinder, and a second exhaust port; the first outlet ports communicating one with one side of each of the pressure responsive members and both of the inlet ports being connected to a source of fluid pressure. Such braking systems will hereinafter be referred to as "of the type described."

The present invention provides a braking system of the type described, wherein there is provided a third valve which is normally in its first condition in which it connects the first exhaust ports to atmosphere but which is operable to its second condition in which such connection is closed and in which the third valve connects the source of fluid-pressure to the first exhaust ports and therethrough to the said first outlet ports. The third valve may normally be held in its first condition by a fluid-pressure pertaining in a brake pipe and is released therefrom to its second condition by a variation in that brake pipe pressure. The third valve may be urged into its second condition by a variation in that brake pipe pressure. The third valve may be urged into its second condition by resilient means held inoperative so long as the brake pipe pressure is at or near its normal pressure but is rendered operative to move the valve into its second condition by said variation in the brake pipe pressure. The third valve may, in this case, have a pressure-responsive member to one side of which is applicable the brake-pipe pressure and on the other side of which is operative the resilient means.

In the connection between the source of fluid pressure and the second fluid pressure inlet port may be a choke and, in this case, there may be provided a normally-closed by-pass means to the choke which by-pass means is opened to permit by-passing of the choke only when the third valve is operative to connect the source of fluid-pressure to the first exhaust ports. The operation of the third valve to con-nect the source of fluid-pressure to the first exhaust ports may also apply that fluid-pressure to a pressure-responsive member in the by-pass means thereby to open the by-pass. In this case, the by-pass means may include a normally-closed valve and a pressure-responsive member to which the fluid-pressure from the source is applied through the third valve to open the normally-closed valve of the by-pass means.

The source of fluid-pressure may be the output of means which varies the pressure of the fluid-pressure of the source in dependence upon the load of a vehicle having the braking system.

There may further be provided isolating means having a normal first condition in which the isolating means provides a first path forming part of the connection between the source of fluid-pressure and the inlet ports of the first valves and a second path providing part of the connection between the exhaust ports of the first valves and atmosphere, the isolating means being movable to a second condition in which both of these valves are closed and a third path is opened connecting the source of fluid-pressure through the third valve to the inlet ports of the first valve. This isolating means may be manually operable and may include valves one in each of the paths, the valves being mechanically inter-linked.

One embodiment of the present invention will now be described in greater detail, by way of example only, with reference to the accompanying drawing which is a diagrammatic representation of the fluid-pressure braking system.

Referring to the accompanying drawing, the braking system comprises an electro-magnetically operated fluid-pressure controlling device 1. The device has three first valves 2, 3, and 4 each having a valve closure member 5 engagable alternatively with associated valve seats 6 and 7 and by engagement with the respective seats of which is controlled communication between first inlet ports 8, first outlet ports 9, the first exhaust ports 10 of the valves 2, 3 and 4 respectively. The position of the valve closure members 5 is determined by the energisation or de-energisation of respective electro-magnetic coils 11.

The braking system specifically shown in the accompanying drawing is of the type known as the "energised to release" type; that is to say, the system is of the type in which energisation of the coils 11 move the associated valve closure members 5 upwardly from their position as shown in the drawing in which they seat against the valve seats 7 thus severing communication between the inlet ports 8 and the outlet ports 9 and putting these outlet ports 9 into communication with the exhaust ports 10.

The outlet ports 9 are connected through conduits 12 with chambers 13, 14 and 15 respectively. The chambers 13, 14 and 15 are defined in part by pressure-responsive members in the form of a diaphragm 16, 17 and 18. These diaphragms are mechanically interconnected by a stem 19 which also connects these diaphragms 16, 17 and 18 with an upper diaphragm 20 the underside of which defines in part a chamber 21 open to atmopshere at 22 through conduits 23 and 24.

Between the valves 2, 3 and 4 and the diaphragm assembly is a second valve 25 of the self-lapping type.

The valve 25 comprises a valve-closure member 26 engagable with annular concentric valve seats 27, and 28. The valve seat 27 is situated between a chamber 29 and the conduit 24 open at 22 to atmosphere. The valve seat 28 is situated between a volume 29 and a conduit 30. The volume 29 is also permanently connected through conduit 31 and choke 32 to chamber 33 on the upper side of the diaphragm 20. The chamber 29 is connected to a conduit 34 to the brake cylinder of the system.

At the opposite end of the drawing from the device 1 is a variable load valve 40 which is, of itself, of well-known construction. The variable load valve is supplied from a main reservoir (not shown) over conduit 41 with a relatively high fluid-pressure which is presented at an inlet port 42 of the valve 40. The operation of the valve 40 is controlled by an air-pressure signal from the vehicle's air suspension (not shown) over conduit 43 applied to a diaphragm 44. The valve 40 is also of the self-lapping type having a double-ended valve closure member 45 of which the opposite ends are respectively engagable with valve seats 46 and 47. The valve seat 46 is situated between the inlet port 42 and the outlet port 48 via a chamber 49 and the valve seat 47 is located between the chamber 49 and an exhaust port 50.

The outlet port 48 is connected to conduit 51 which branches into conduit 52 and 53.

The conduit 51 opens into a chamber 54 in an emergency valve 55. The valve 55 includes a pressure-responsive member in the form of a piston 56 slidable in a cylinder 57 and acted upon on its upper side by a spring 58 in chamber 59 oepn at 60 to atmosphere. The piston 56 carries a hollow stem 61 through which a chamber 62 on the opposite side of a valve closure member 63 from the chamber 54 is connected to atmosphere through the chamber 59 and opening 60. The valve closure member 63 is engagable with a valve seat 64 on the end of the hollow stem 61 and with an annular valve seat 65 into engagement with which it is resiliently urged by a spring 66. The chamber 62 is connected via a conduit 67 to a chamber 68 on the upper side of a diaphragm 69 in by pass means 70. The under side of the diaphragm 69 forms part of a chamber 71 open to atmosphere at 72. Connected to the diaphragm 69 is a push-rod 73 engagable with a valve closure member 74 normally engaged by a spring 75 with a valve seat 76 to close communication between inlet and outlet conduits 78 and 77 respectively.

The conduits 78 and 77 are connected to the conduit 30 with there being positioned in the conduit 30 between the points of communication of the conduits 78 and 77 with the conduit 30, a choke 80.

The conduit 30 is connected to the conduit 41 arranged as above discribed to be fed from a main reservoir (not shown) and to supply fluid-pressure to the inlet port 42 of the variable load valve 40 and (over conduit 30) to the inlet port 82 of the self-lapping valve of the device 1.

The system also includes isolating means 90 comprising valves 91, 92 and 93. The valve 91 controls a first path through the isolating means 90 between conduit 94 connected to conduit 51 via conduit 53 and conduit 95 commonly connected through the inlet ports 8 of the valves 2, 3 and 4. The valve 92 controls flow of fluid through a second path which passes through the isolating means 90 being connected at one end to conduit 96 commonly connected to the exhaust ports 10 of the valves 2, 3 and 4 and at the other end to a conduit 97 connected to conduit 67 extending between the emergency valve 55 and the by-pass means 70.

The valve 93 of the isolating means 90 controls a path through the means 90 inter-connecting the conduit 97 and (through conduit 98) the conduit 95.

The operation of the above-described braking system is as follows:

Relatively high pressure from the main reservoir (not shown) is fed over conduit 41 to the inlet port 42 of the variable load valve 40 and through conduits 30 (via choke 80 — the by-pass means 70 being closed) to the inlet port 82 of the valve 25.

The variable load valve 40 will, in the well-known manner, reduce the value of the pressure persented at the inlet port 42 to some lower pressure at the outlet port 48 in dependence upon the pressure signal applied to the diaphragm 44 of the variable load valve 40 over the conduit 43 from the air suspension (now shown).

The thus load-varied pressure will be applied, firstly, over conduit 51 to the chamber 66 of the emergency valve 55 and, secondly, through the conduit 53, conduit 94, the first path through the isolating means 90, and conduit 95 to the inlet ports 8 of the valves 2, 3 and 4. As the system shown and described is an "energised to release" system, the coils 11 will normally all be energised so that the upper ends of the valve closure members 5 will engage the seats 7 and thus close the inlet ports 8 in which condition fluid-pressure is prevented from being fed through the valve 2, 3 and 4 to the chambers 13, 14 and 15.

NORMAL ELECTRO-MAGNETIC APPLICATION

In dependence upon the degree of brake application required, one or more of the coils 11 will be de-energised so that the associated valve closure member(s) 5 will be moved downwardly out of engagement with the seat(s) 7 into engagement with the seat(s) 6. By such operation of the valve closure member (s) 5 the associated inlet port(s) 8 will be opened and the associated outlet port(s) 10 will be closed thus permitting the application of the fluid-pressure presented by the variable load valve 40 at the inlet port(s) 8 to pass through the respective one(s) of the valves 2, 3 and 4 over the respective one(s) of the conduits 12. Thus, one or more of the chambers 13, 14 and 15 will be pressurised to cause an upward force to be exerted on the stem 19. This upward force on the stem 19 will move upwardly the valve seat 27 lifting the valve closure member 26 of the valve 25 out of engagement with the valve seat 28. As a result the output pressure from the variable load valve 40 presented at the inlet port 82 of the valve 25 as above described, will pass through the now-open seat 28 into the conduit 34 and from thence into the brake cylinder (not shown). As the pressure builds-up in the brake cylinder so will the pressure build-up in the chamber 29 and this pressure will be fed over the conduit 31 and the choke 32 to the chamber 33 on top of the diaphragm 20. As the pressure in the chamber 33 builds-up, a stage will be reached at which the downward force on the stem 19 resulting from the pressure in the chamber 33 acting on the diaphragm 20 will balance the upward force on the stem 19 resulting from the pressure in one or more of the chambers 13, 14 and 15 dependent upon which and how many of the valves 2, 3 and 4 have been operated by de-energisation of the coils 11. At this balance stage, the valve closure member 26 will re-seat against seat 28 but with member 26 still against seat 27 thus locking into the brake cylinder (not shown) a pressure which has been determined both by the loading of the vehicle having the braking system and by the coils 11 which have been de-energised in dependence upon the degree of braking "requested" by the driver.

NORMAL ELECTRO-MAGNETIC RELEASE

This release is obtained by re-energisation of such of these coils 11 as were previously de-energised. Such re-energisation will cause the associated valve closure member(s) previously moved downwardly to be restored to the upper position in which the inlet port(s) 7 is or are again closed. Such lifting of the valve closure member(s) 5 will release such pressure as was applied to the one or more of the chambers 13, 14 and 15 through the respective conduit(s) 12, valve seat(s) 6, exhaust port(s) 10, conduit 96, the second path through the isolating means 90, conduit 97, conduit 67, the hollow stem 61 of the piston 56 of the emergency valve 55, chamber 59, and exhaust 60. Thus, the pressure in all of the chambers 13, 14 and 15 will be restored to atmospheric pressure thus relieving the previous upwardly-directed force on the stem 19 so that due to the brake cylinder pressure prevailing in the chamber 33 acting on the diaphragm 20 to produce a downwardly-directed force on the stem 19, the seat 27 of the valve 25 will be moved out of engagement with the valve closure member 26 and put both the chamber 33 and the conduit 34 into communication with atmosphere thorugh the valve seat 27, the conduit 24 and the exhaust 22. The brake cylinder will thus be emptied of fluid-pressure and the brakes released.

EMERGENCY APPLICATION

The underside of the piston 56 of the emergency valve 55 is subject to such pressure as may be pertaining in the cylinder 57 and this pressure is that normally pertaining in the brake pipe (not shown) which communicates with the cylinder 57 over a conduit 100.

The value of the pressure in the brake pipe is sufficiently high as to generate on the piston 56 an upwardly-directed force sufficient to overcome the downwardly-directed force exerted by the spring 58 on the piston 56. Thus, the piston 56 is held in its uppermost position (as shown in the drawing) this, inter alia, allowing venting of the chambers 13, 14 and 15 through the stem 61 of the piston 56 as above described.

If, however, an emergency application is made by considerably reducing the pressure in the brake pipe, the pressure in the cylinder 57 will resultingly fall and, indeed, will fall to a value at which the force exerted by the pressure in the cylinder 57 on the piston 56 in an upward direction is insufficient to overcome the downward force exerted by the spring 58.

Movement downwardly of the piston 56 under the influence of the spring 58 will cause the seat 64 on the stem 61 of the piston 56 to engage the valve closure member 63 (thus cutting-off communication of the volume 62 with atmosphere) and pushing the valve closure member 63 against the spring 66 out of engagement with the seat 65.

The output pressure of the variable load valve 40 which, as described above, is present in the chamber 54 can flow through the now-open seat 65 into conduit 67. This fluid-pressure is, firstly, applied in chamber 68 to the diaphragm 69 to move that diaphragm downwardly and to cause its push-rod 73 to engage the valve closure member 74 of the by-pass means 70 to unseat that valve closure member from the seat 76. By this action, a by-pass path via conduit 78, seat 76, and conduit 77 is set-up across the choke 80 so that the relatively high pressure in the conduits 41 and 81 can flow unrestrictedly through that by-pass path and conduit 30 to be presented at the inlet port 82 of the valve 25.

In addition, the output of the variable load valve 40 is applied through the emergency valve and the conduit 67 to the conduit 97 from whence it is applied through the second path through the isolating means 90, and the conduit 96 to the exhaust ports 10 of the valves 2, 3 and 4.

Assuming that no electro-magnetic application was in the course of being made at the time of the making of the emergency application, all of the valve closure members 5 will be in their uppermost postition in which they are engaged with their respective seats 7 to close the inlet ports 8. Thus, the valve closure members 5 will be out of engagement with the exhaust ports 10 and the pressure now there-applied will flow through the valve seats 6 to the outlet ports 9 and through the conduits 12 to all of the chambers 13, 14 and 15.

As in the case of a normal electro-magnetic application this pressurisation of the chambers 13, 14 and 15 will generate on the stem 19 an upwardly-directed force which will be of the maximum magnitude (subject to the limitation of fluid-pressure determined by the variable load valve 40) to move, as in the case of a normal electro-magnetic application, the seat 27 upwardly to disengage the valve closure member 26 of the valve 25 from its seat 28 to allow the flow of fluid-pressure from the output port 48 of the variable load 40 over the conduit 30 and the conduit 34 to the brake cylinder (not shown). Hence, a maximum degree of brake application will be achieved.

Should, however, a normal electro-magnetic application have been in the course of being made when the emergency application was made, this would be of no consequence for such an application would have already effected some degree of brake application. If, however, this had not been a full brake application, one or more of the valve closure members 5 would have been in their upward position with, resultingly, certain of the chambers 13, 14 and 15 not being pressurised. Nevertheless, by virtue of the emergency application such unpressurised chambers 13, 14 or 15 would become pressurised as above described so that the brake application would be increased to a full brake application.

It will be noted that in an emergency application, not only is a brake application made to its full extent but it will be made more rapidly than even a full normal electro-magnetic application for the choke 80 is by-passed through the by-pass means 70 in the case of an emergency application whereas the choke 80 is not so by-passed in a normal electro-magnetic application albeit that that application is to a full extent.

FAILURE OF THE ELECTRO-MAGNETIC SYSTEM

The emergency application described above could be made either by a passenger pulling the conventional "emergency" Cord or by the driver reducing the brake pipe pressure. In the latter case, the driver may have performed this operation as a result of his recognition of failure of the electro-magnetic equipment.

In this latter event, subsequent to making the emergency application by the dropping of the brake pipe pressure with the result as above described, the driver would then walk along the train operating the isolating units 90 on each vehicle. As indicated in the drawing, the various parts of the isolating means 90 are interconnected requiring the driver merely to operate a single lever and, by so doing, he will vary the condition of the paths through the isolating means above described. By manual operation of the isolating means 90, the driver will break the first and second paths above described by closing the communication between the conduits 94 and 95 and the communication between the conduits 96 and 97 but will open up a third path interconnecting the conduits 97 and 98. By the closing of the first path, communication is severed between the conduit 51 and the conduit 95 leading to the inlet ports 8 of the valves 2, 3 and 4 and by the closing of the second path communication is severed between the outlet ports 10 and the conduit 67 through which (in the normal electro-magnetic release of the brakes) the chambers 13, 14 and 15 were de-pressurised.

By the opening up of the third path (i.e. by the interconnecting of the conduits 97 and 98) fluid-pressure present in the conduit 67 (by virtue of the making of any subsequent emergency application) pass-es through the third path in the isolating means 90 to the conduit 98 and from thence to the conduit 95 to the inlet ports 8 of the valves 2, 3 and 4. The driver having now switched-off the electro-magnetic means, the coils 11 will be de-energised so that the valve closure members 5 will take up their positions as shown in the drawing thus closing the exhaust ports 10 and permitting such pressure as may be applied to the inlet ports 8 to pass to the outlet ports 9 and from thence to the chambers 13, 14 and 15 to effect an equivalent of an emergency application.

A release of the brakes subsequent to an emergency application upon recognition of failure of the electro-magnetic system, can be effected by restoring the pressure in the brake pipe which will result in restoration of the pressure in the cylinder 57. Such restoration of the pressure in the cylinder 57 will move the piston 56 upwardly against the spring 58 of the emergency valve 55 and, particularly, will lift the seat 64 out of engagement with the valve closure member 63 which will be returned into engagement with the seat 65 by the spring 66. Such upward movement of the piston 56 will vent the chamber 62 through the hollow stem 61 of the piston 56, the chamber 59 and the exhaust 60. Through this now open path, the pressure in the chambers 13, 14 and 15 can be flowing via the conduits 12, the inlet ports 8, the conduit 95, the conduit 98, the still open third path through the isolating means 90, the conduit 97 and the conduit 67.

Once failure of the electro-magnetic system has occurred the driver can, of course, only make emergency applications and can only release his brakes through re-pressurisation of the brake pipe.

If the emergency application has been made for a reason other than failure of the electro-magnetic system, restoration of the brake pipe pressure subsequent to an emergency application will restore the emergency valve 55 to its condition as above described and as shown in the drawing and the system generally will be restored for conventional electro-magnetic application and release of the brakes.

Having thus described our invention what we claim is:

1. A fluid pressure braking systems having a plurality of electro-magnetically controlled first valves each controlling communication between a first fluid-pressure inlet port, a first outlet port, and a first exhaust port associated with each of the first valves; multiple pressure-responsive members of differing effective areas operatively controlling a second valve which itself controls communication between a second fluid-pressure inlet port, a second outlet port connected to a brake cylinder, and a second exhaust port; the said first outlet ports communicating one with one side of each of the pressure responsive members and each of the inlet ports being connected to fluid pressure source means; and a third valve movable between first and second conditions, said third valve being normally in its first condition in which it connects the first said exhaust ports to atmosphere and wherein in its second condition it closes such connection of the first exhaust ports to atmosphere and instead connects a fluid-pressure source means to the said first exhaust ports and therethrough to the said first outlet ports.

2. A braking system as claimed in claim 1, including means for normally holding the third valve in its first condition by a fluid-pressure pertaining in a brake pipe and releasing it therefrom to its second condition by a variation in that brake pipe pressure.

3. A braking system as claimed in claim 2, wherein the last said means includes means for urging the third valve into its second condition by resilient means held inoperative so long as the brake pipe pressure is at or near its normal pressure but rendered operative to move the valve into its second condition by said variation in the brake pipe pressure.

4. A braking system as claimed in claim 3, wherein the third valve has a pressure-responsive member to one side of which the brake-pipe pressure is applicable and on the other side of which the resilient means is operative.

5. A braking system according to claim 1, including a choke in the connection between the fluid pressure source and the second fluid pressure inlet port.

6. A braking system as claimed in claim 5, wherein there is provided a normally-closed by-pass means for by-passing the choke, which by-pass means is openable to permit by-passing of the choke only when the said third valve is operative to connect the fluid-pressure source means to the first exhaust ports.

7. A braking system as claimed in claim 6, including a pressure-responsive member in the by-pass means positioned to open the by-pass, and said third valve including means for applying fluid pressure to said pressure-responsive member to open the by-pass when the third valve connects the fluid-pressure source means to the first exhaust ports.

8. A braking system as claimed in claim 7, wherein the by-pass means includes a normally-closed valve openable to open the by-pass member when fluid-pressure is applied through the third valve the pressure-responsive member.

9. A braking system according to claim 1, wherein the fluid-pressure source means includes means for varying the fluid-pressure in dependence upon the load of a vehicle having the braking system.

10. A braking system according to claim 1, including, isolating means having a normal first condition in which the isolating means provides a first path forming part of the connection between the fluid-pressure source means and the inlet ports of the first valves and a second path providing part of the connection between the exhaust ports of the first valves and atmosphere, the isolating means being movable to a second condition in which both of these paths are closed and a third path is opened connecting the fluid-pressure source means through the third path to the inlet ports of the first valve.

11. A braking system as claimed in claim 10, wherein the isolating means is manually operable and includes, valves one in each of the paths, and means for mechanically interlinking the valves.

* * * * *